United States Patent Office 3,838,074
Patented Sept. 24, 1974

3,838,074
PROCESS FOR PREPARING POLYURETHANE FOAM
Yoichi Hoshino, Tokyo, Kotaro Honda and Chihito Funayama, Yokohama, and Goro Tanaka, Yamato, Japan, assignors to Mitsubishi Chemical Industries Limited, Tokyo, Japan
Filed Jan. 5, 1973, Ser. No. 321,471
Claims priority, application Japan, Jan. 10, 1972, 47/5,107
Int. Cl. C08g 22/46
U.S. Cl. 260—2.5 BD
8 Claims

ABSTRACT OF THE DISCLOSURE

A process for preparing a polyurethane foam by a frothing process by mixing a polyol, a polisocyanate, a primary foaming agent, a secondary foaming agent and a catalyst in a helix-mixer which comprises introducing a first component comprising a primary foaming agent to the helix-mixer and then introducing a second component to said mixer which second component comprises said polyol, polyisocyanate, secondary foaming agent and catalyst, wherein the initial ratio of the feed rate of said first component to that of said second component at the initiation of the supply of said second component is at least 1.5 times the normal ratio of the feed rate of said first component to the feed rate of said second component under normal operating conditions, and wherein said primary foaming agent is supplied to said mixer in a quantity as required by said initial ratio during said period preceding the introduction of said second component.

BACKGROUND OF THE INVENTION

Field of the Invention

This invention relates to a process for preparing a polyurethane foam by means of a frothing technique.

Description of the Prior Art

In a well known frothing process, three components consisting of (1) a polyol component containing a catalyst, a surfactant and a secondary foaming agent, (2) a polyisocyanate component and (3) a primary foaming agent are admixed in a mixer and the mixture is dispersed from an outlet of the mixer as an initially foamed product which is fed into a mold. The foamed product may be further foamed by a secondary foaming process in order to prepare a polyurethane foam. In the frothing process, it has been necessary to maintain a pressure of 3–6 kg./cm.$^2$ in the mixer because solvents such as dichlorodifluoromethane which have low boiling points are mixed as the primary foaming agent in the liquid mixture. The mixing devices which have been employed include a conventional mixing head equipped with a let-down valve or a helix-mixer as a pressure maintenance apparatus. When the let-down valve is employed, the mixer is equipped with a rotary stirrer whose rotation may be stopped by solidification of the liquid mixture. Moreover, the stirring efficiency of the rotary stirrer is low, thus suffering the disadvantage of requiring a large sized mixer. When the helix-mixer is employed, operation and maintenance are rendered easy because there are no rotating parts. Thus, the stirring efficiency is increased which in turn permits minimization of the size of the mixer. Accordingly, helix-mixers have been mainly employed for frothing-in-place in the processes for the manufacture of parts for electrical refrigerators, refrigerating show-cases, sandwich panels, and the like. However, frothing by the helix-mixer has the following difficulties.

First, when a polyol, a polyisocyanate, a primary foaming agent, a secondary foaming agent, a catalyst and other components are simultaneously injected at feed rates the same as "the feed rate under normal operating conditions" (a feed rate which provides suitable mixing under normal operating conditions to provide suitable primary foaming) into the mixing chamber of the helix-mixer, the highly viscous liquid of the injected mixture blocks the helix-mixer, which leads to a great increase in the pressure at the initiation of the injection causing poor mixing of the components. This sometimes causes a back current to close a sliding component of the mixer or a pipe. In this instance, when the amount of the foaming agent is greatly increased, no temporary closing results. However, the liquid mixture injected as a spray from the mixer forms a foam which possesses many voids. Moreover, the heat of vaporization of the foaming agent results in a decrease in the temperature of the liquid mixture which causes unsmooth foaming and poor curing of the product. These factors are not desirable in the operation of the foaming apparatus, and disadvantageously affect the resulting product.

Second, when a primary foaming agent is initially injected into the mixing chamber at a feed rate the same as the feed rate under normal operating conditions and thereafter the polyol, polyisocyanate and other components except the primary foaming agent are injected at a feed rate the same as the feed rate under normal conditions, the resulting initial increase in pressure results in an improvement in the relatively poor mixing of the mixture in comparison to when the components are simultaneously injected. However, these improvements are insufficient.

Third, when continuous injection of the foaming system is used, no additional control of the injection is needed when the first portion of the injected liquid is stopped. However, the total injection time is usually about 3–30 seconds in the instances where an intermittent frothing-in-place method is used for the manufacture of parts of electrical refrigerators, show-cases, sandwich panels, and the like. Thus, the loss in raw materials is high if the initial liquid injected is stopped. On the other hand, if the injected liquid is not stopped, a portion or most of the foam is poor. However, the full advantage of the frothing method is still not fully realized.

Fourth, when frothing is conducted in a helix-mixer, the liquid mixture and the primary foaming agent are passed down the helix contour and the gaseous foaming agent is passed down an inner portion of the helix whereby mixing of the liquid mixture system is improved by a turbulent flow of the gaseous foaming agent. The efficiency of the foaming agent is optimized when the initial pressure of the liquid mixture system passing through the helix-mixer is the same or higher than the vapor pressure of the foaming agent. Thus, the helix-mixer has been designed so as to maintain the pressure of the liquid mixture at the entrance of the chamber the same as the vapor pressure of the primary foaming agent while considering the viscosity and the injection velocity of the liquid mixture.

Desirable frothing can be achieved under normal conditions with the helix-mixer. However, it is difficult to maintain a preferable pressure in the mixer at the initiation of the injection, thus rendering it difficult to provide normal frothing for a few seconds under normal operating conditions. Therefore, serious operational difficulties occur until a normal pressure balance is reached in the instances of intermittent injection. In order to obtain a normal pressure balance in this period, it is possible to close an outlet of the mixer by fitting a soft hose or a valve onto the outlet from the initial period of injection until the predetermined pressure is reached. However, these procedures complicate the operation and give rise to various problems in industrial applications.

A need therefore exists for a method for preparing polyurethane foams which overcomes the operational difficulties of the prior art processes.

SUMMARY OF THE INVENTION

Accordingly, it is an object of this invention to provide a process for preparing polyurethane foams by a frothing method.

Another object of this invention is to provide an improved frothing technique using a helix-mixer.

Another object of this invention is to provide a novel technique to give entirely good foams even in the initial stages of the frothing-in-place technique.

Briefly, these objects and other objects of this invention, as hereinafter will become apparent, can be attained by providing a process for preparing polyurethane foams by mixing a polyol, a polyisocyanate, a primary foaming agent, a secondary foaming agent, a catalyst and the like in a helix-mixer in frothing process, which comprises introducing a first component comprising a primary foaming agent into the mixer and then introducing a second component to said mixer which second component comprises said polyol, polyisocyanate, secondary foaming agent and catalyst, wherein the initial ratio of the feed rate of said first component to that of said second component at the initiation of the supply of said second component is at least 1.5 times the normal ratio of the feed rate of said first component to the feed rate of the said second component under normal operating conditions, and wherein said foaming agent is supplied to said mixer in a quantity as required by said initial ratio during said period preceding the introduction of said second component.

BRIEF DESCRIPTION OF THE DRAWINGS

The drawings illustrate time schedules for the supply of the primary foaming agent into a mixer in accordance with the invention.

DESCRIPTION OF THE PREFERRED EMBODIMENTS

In the operation of the process of this invention, it is necessary to supply the primary foaming agent into the helix-mixer before supplying the other components in the helix-mixer, and the ratio P is at least 1.5 times the ratio Q.

Figure 1:
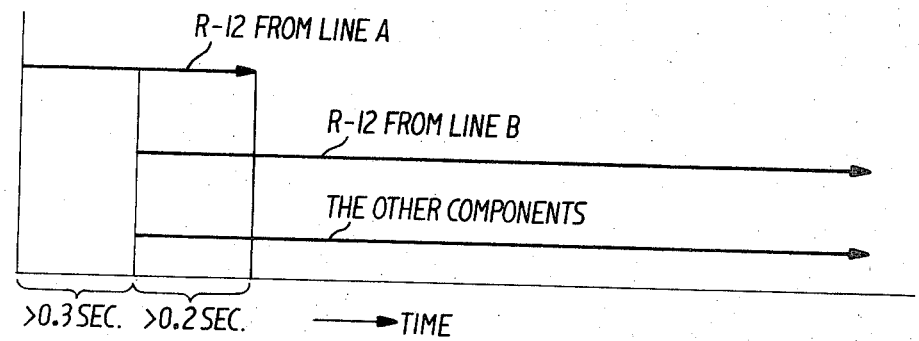
FIG. 1 illustrates the time schedule for a supply system with two lines.
Figure 2:
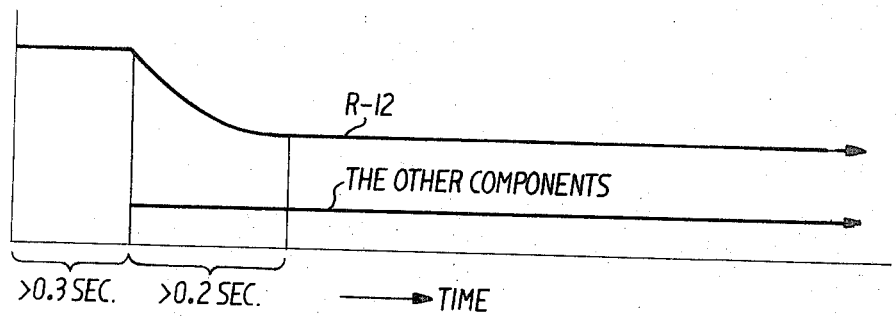
FIG. 2 illustrates the time schedule for a one line supply system.

The foaming agent may be supplied to the mixer by several means which comply to the additive conditions. For example, as shown in FIG. 1, two lines of the supply system of the primary foaming agent (referred to as R-12) are provided so as to supply the components differentially. It is also possible to employ a process which supplies the primary foaming agent at an increased feed rate, and after a predetermined period, the feed rate of the foaming agent is decreased to the normal rate as shown in FIG. 2. When the primary foaming agent is supplied in two lines, the primary foaming agent is initially supplied through line A at a feed rate at least 0.5 times the feed rate of the primary foaming agent injected through line B, simultaneously with the other components which provide desirable frothing under normal operating conditions.

In the optimum embodiment, the rate of the primary foaming agent through line A is 0.5–3.0 times, preferably 0.8–1.5 times the rate of the primary foaming agent through line B. If the feed rate of line A is less than 0.5 times, the desired results of this invention are difficult to achieve. On the other hand, if the quantity fed through line A is too great, the advantages of this invention are lost. This results in an uneconomical use of the foaming agent. Thus, it is unnecessary to use a quantity of foaming agent greater than 3 times the amount of foaming agent fed through line B.

After at least 0.3 second have passed from the initiation of the supply of the primary foaming agent through line A, the primary foaming agent is fed at a feed rate the same as the rate of the primary foaming agent fed under normal operating conditions through line B. Simultaneously, the supply of the other components is initiated at a rate the same as the rate of these components under normal operating conditions.

The interval from the initiation of supply of the primary foaming agent through line A to the initiation of the supply of the other components is at least 0.3 second. However, if the interval is too long, the primary foaming agent is uneffectively exhausted and the mixer is cooled too greatly by the vaporization of the primary foaming agent. The interval is preferably in the range of 0.5–1 second. After a time interval of more than 0.2 second has elapsed from the initiation of the injection of the other components, the supply of the primary foaming agent through line A is stopped. Thus, the ratio of the feed rate of the primary foaming agent to that of the other components initially is maintained at a predetermined value. However, the time at which said value is maintained is influenced by consideration of the components selected, the type of primary foaming agent used and the excess rate employed for feeding the foaming agent. The time usually ranges from 0.3–3 seconds, preferably 0.4–1.0 second.

The results of this invention cannot be achieved when the time at which said ratio is maintained is less than the indicated range. On the other hand, if the time is too long, an excess quantity of the primary foaming agent is supplied which is in excess of that required to form the primary foam as a spray. Under these conditions, it is difficult to provide suitable frothing. Moreover, the foaming agent is uneconomically spent, and the curing reaction after the primary foaming is too slow because of the loss of heat through vaporization of the foaming agent even though no increase in the pressure within the mixer or poor mixing is found.

When the process shown in FIG. 2 is employed as an embodiment of this invention, the feed rate of the primary foaming agent supplied prior to injecting the other components, is 1.5–4.0 times, preferably 1.8–2.5 times, the feed rate of the primary foaming agent under normal operating conditions. After a time interval of more than 0.3 second, preferably 0.5–1.0 second, has elapsed from the initiation of the supply of the primary foaming agent, the other components are supplied. Simultaneously, the feed rate of the primary foaming agent is decreased to the predetermined feed rate under normal operating conditions for more than 0.2 seconds. This time is usually in the range of 0.3–3 seconds, preferably 0.4–1.0 second. In this case, the process of these embodiments controls the feed rate of the primary foaming agent by a simple operation in order to maintain the feed rate of the primary foaming agent to the other components at a value higher than a predetermined value. However, similar results can also be obtained by controlling the feed rate of the other components. If the process of this invention is applied to a conventional frothing apparatus, the apparatus can be equipped with a flow-controlling value and a cock as a by-pass in the primary foaming agent supply system, or it can be operated by a conventional flow-controlling valve controlled by a time schedule.

The components used in the process of this invention can be selected from the materials used in conventional frothing processes. Thus, suitable polyisocyanates include tolylene diisocyanates such as 2,4-tolylenediisocyanate, 2,6-tolylenediisocyanate and mixtures thereof; diphenylmethane diisocyanates, such as 4,4'-diphenylmethane diisocyanate, 2,4'-diphenylmethane diisocyanate and mixtures thereof; polymethylene polyphenylene polyisocyanate obtained by the phosgenation of the condensation product of aniline and formaldehyde; hexamethylene diisocyanate, and the like. It is also possible to use prepolymers having a terminated isocyanate group which are obtained by reacting a small amount of one of the following polyols with the polyisocyanate. Suitable polyols include any polyols useful for the preparation of polyurethanes such as polyester-polyols, and polyether-polyols. The preferred polyols are selected depending upon the mechanical properties required for the foamed polyurethane product.

Suitable catalysts include the usual catalysts which are used for the preparation of polyurethanes such as amine catalysts and metal catalysts, e.g., tin, lead and the like. The catalyst is usually supplied to the reaction mixture in the mixer together with the polyol. In general, a surfactant, silicon oil or paraffin, a flame retardant, a pigment, or the like can be incorporated in the preparation of the polyurethane foam. These auxiliary components can be supplied together with the polyol to the mixer.

In the frothing process, the foaming is performed in two steps. Two types of foaming agents for the primary foaming agent and the secondary foaming agent can be used in the two steps. The primary foaming agent can be material which is easily vaporized at atmospheric pressure, and includes dichlorodifluoromethane, monochlorodifluoromethane, trifluoromethane, monochlorotrifluoromethane, monochloropentafluoroethane, vinylfluoride, vinylidene-fluoride, 1,1 - difluoroethane, 1,1,1 - trichlorodifluoroethane, and the like.

The secondary foaming agent can be a gaseous material at the reaction temperature and has a boiling point ranging from 10–80° C. Suitable foaming agents include trichloromonofluoromethane, 1,1,2 - trichloro - 1,2,2-trifluoroethane, acetone, pentane, and the like. It is also possible to use materials which generate carbon dioxide gas as exemplified by the reaction of an isocyanate with water, boric acid, nitroethane, nitrourea, amine, amide, carboxylic acid, and the like. Suitable frothing processes are illustrated in the references: R. E. Knox, *Chem. Eng. Progr. 57*(10), 40, (1961), and R. E. Knox, *J. Cell, Plast., 1*(1), 150 (1965).

Dimensional stability may be imparted to a rigid polyurethane foam at low temperature when a small amount of water, i.e., 0.05–2% by weight based on the resulting polyurethane is used together with trichloromonofluoromethane as the secondary foaming agent. The amount of primary foaming agent employed usually ranges from 5–25 parts by weight, preferably 7–15 parts by weight, to 200 parts by weight of the total amount of polyisocyanate and polyol used. The amount of secondary foaming agent employed usually ranges from 1–60 parts by weight, preferably 5–40 parts by weight. Mixing of the components is usually performed at 0–80° C. under a pressure of 1–10 kg./cm.$^2$g., preferably 3–7 kg./cm.$^2$g. (gauge pressure).

As stated earlier, in accordance with the process of this invention, it is possible to maintain a desirable pressure balance in the mixer and to inject the liquid mixture as a suitable foam from the initiation of the supply of the liquid mixture. As a result, desirable frothing occurs without any loss during the initial flow of the materials discharged from the mixer. Accordingly, the process of this invention is advantageous not only for continuous injection processes, but also especially for intermittent injection processes which are used in the manufacture of parts for electrical refrigerators, show-cases, and the like.

Having now generally described the invention, a further understanding can be obtained by reference to certain specific examples which are provided herein for purposes of illustration only and are not intended to be limiting unless otherwise specified. In the following examples, the terms "parts" and "percent" are by weight unless specified otherwise.

EXAMPLE 1

A crude MDI (polymethylene polyphenylene polyisocyanate) having a 31.5% NCO group proportion (manufactured by the Upjohn Co., trade name PAPI) was used as the polyisocyanate. 94.2 parts of a polyol having an OH value of 450, which is the addition product of propylene oxide with sucrose, 0.2 part of triethylenediamine, 0.5 part of triethylamine, 2.0 parts of silicon oil and 35 parts of trichloromonofluoromethane as a secondary foaming agent were admixed to prepare a polyol solution. Dichlorodifluoromethane, as a primary foaming agent, was supplied through two lines to a mixer equipped with a helix-mixer having a diameter of 4 cm. and 12 plates. Dichlorodifluoromethane was fed at the rate of 200 g./min. through the first line, and after 1 second from the initiation of the supply, dichlorodifluoromethane was fed at the rate of 200 g./min. through the second line. Simultaneously, the polyisocyanate was supplied at the rate of 2120 g./min., and the polyol solution was supplied at the rate of 2630 g./min.

The supply of the foaming agent through the first line was stopped after an interval of 1 second had elapsed from the initiation of the flow through the second line. The liquid mixture discharged from the mixer had the consistency of shaving cream, and the initial foam density was 0.18 g./cm.$^3$. The foam density under normal operating conditions after 10 seconds had elapsed from the initiation of the injection was 0.18 g./cm.$^3$. The polyurethane foam which was produced initially, and the polyurethane foam produced under normal operating conditions, had uniform cells and did not have a striped pattern or voids.

EXAMPLE 2

A primary foaming agent, dichlorodifluoromethane, was supplied through one line at the rate of 400 g./min. in the mixer employed in Example 1. After 0.5 second had elapsed from the initiation of the supply of foaming agent, the polyisocyanate and the polyol solution of Example 1 were supplied at the rate 2120 g./min. and 2630 g./min., respectively. Simultaneuosly, the rate of supply of dichlorodifluoromethane was reduced to 200 g./min. after 1 second had elapsed from the initiation of the supply of the other components. In this case, the liquid mixture discharged initially from the mixer had the consistency of shaving cream, and the foam density of the liquid mixture initially was 0.18 g./cm.$^3$. The foam density under normal operating conditions after 10 seconds had elapsed from the initiation of the injection was also 0.18 g./cm.$^3$. The polyurethane foam which was produced initially, and the polyurethane foam produced under normal operating conditions had uniform cells and did not have a striped pattern or voids.

REFERENCE 1

The polyisocyanate solution, the polyol solution and the mixer of Example 1 were used, wherein 200 g./min. of dichlorodifluoromethane, 2120 g./min. of the polyisocyanate solution and 2630 g./min. of the polyol solution were simultaneously supplied to the mixer. The liquid mixture discharged from the mixer was in a liquid form for 4 seconds beginning from the initiation of the reaction, and then changed to the consistency of shaving cream. The density of said liquid mixture initially was 1.20 g./cm.$^3$, and the foam density of the shaving cream-like liquid mixture was 0.18 g./cm.$^3$. The polyurethane foam produced initially was a foam having a striped pattern under an abbreviated stirring.

REFERENCE 2

The polyisocyanate solution, the polyol solution and the mixer of Example 1 were used, wherein dichlorodifluoromethane was supplied to the mixer at the rate of 300 g./min. After 2 seconds had elapsed from the initiation of the supply of the foaming agent, the polyisocyanate solution and the polyol solution were supplied at the rate of 2120 g./min. and 2630 g./min., respectively. The foam density of the liquid mixture injected initially was 0.8 g./cm.$^3$. The liquid mixture was injected under normal operating conditions as a spray, and the foam density thereof was 0.16 g./cm.³. The polyurethane foam produced initially under poor mixing conditions had a striped pattern and the polyurethane foam produced under normal operating conditions had many voids of finger head size.

Having now fully described the invention, it will be apparent to one of ordinary skill in the art that many changes and modifications can be made thereto without departing from the spirit or scope of the invention as set forth herein.

What is claimed as new and intended to be covered by letters patent is:

1. A process for preparing a polyurethane froth by a frothing process by mixing a polyol, a polyisocyanate, a primary foaming agent, a secondary foaming agent and a catalyst in a helix-mixer, which comprises: introducing said primary foaming agent which generates said polyurethane froth through a first line into said helix-mixer for an initial period ranging from 0.8 seconds up to a time before the primary foaming agent is uneffectively exhausted and the mixer is cooled too greatly by vaporization of the primary foaming agent, and then introducing a mixture of a polyol, a polyisocyanate, a secondary foaming agent which further foams said polyurethane froth in a subsequent step and a catalyst through a second line while simultaneously continuing to supply said primary foaming agent through said first line for an additional period ranging from 0.2 to 3.0 seconds and initiating the suply of said primary foaming agent through a third line, wherein the rate of said primary foaming agent through said first line is 0.5–3.0 times the rate of said primary foaming agent through said third line and wherein the ratio of the rate of said primary foaming agent through said third line to the rate of said mixture through said second line is consistent with the admixture of said primary foaming agent and said mixture in said helix-mixer under the normal operating conditions of 1–10 kg./cm.² gauge pressure and 0–80° C.

2. The process of Claim 1, wherein the introduction of said primary foaming agent discharged into said mixer from said first feed line is terminated after said additional period of 0.4–1.0 second from the initiation of the introduction of said mixture.

3. The process of Claim 1, wherein the initial period is in the range of 0.3 to 1.0 second.

4. A process for preparing a polyurethane froth by a frothing process by mixing a polyol, a polyisocyanate, a primary foaming agent, a secondary foaming agent and a catalyst in a helix-mixer, which comprises: introducing a primary foaming agent, which generates said polyurethane froth, through a first line into said helix-mixer for an initial period ranging from 0.3 seconds up to a time before the primary foaming agent is uneffectivily exhausted and the mixer is cooled too greatly by vaporization of the primary foaming agent, and then introducing a mixture of a polyol, a polyisocyanate, a secondary foaming agent which further foams said polyurethane froth in a subsequent step and a catalyst through a second line while simultaneously reducing the rate of said primary foaming agent over a period of 0.2 to 3.0 seconds to the rate used relative to the rate of said mixture under the normal operating conditions of 1–10 kg./cm.² gauge pressure and 0–80° C., wherein the rate of said primary foaming agent in said initial period ranges from 1.5–4.0 times the rate of said primary foaming agent under said normal operating conditions.

5. The process of Claim 4, wherein said period for reducing the rate of said primary foaming agent is 0.4–1.0 second.

6. The process of Claim 4, wherein the initial period is in the range of 0.3 to 1.0 second.

7. A process for preparing a polyurethane froth by a frothing process by mixing a polyol, a polyisocyanate, a primary foaming agent, a secondary foaming agent and a catalyst in a helix-mixer, which comprises: introducing a primary foaming agent, which generates said polyurethane froth, through a first line into said helix-mixer for an initial period ranging from 0.3 seconds up to time before the primary foaming agent is uneffectively exhausted and the mixer is cooled too greatly by vaporization of the primary foaming agent, at a steady rate used under the normal operating conditions of 1–10 kg./cm.² gauge pressure and 0–80° C., and then introducing a mixture of a polyol, a polyisocyanate, a secondary foaming agent which further foams said polyurethane froth in a subsequent step and a catalyst through a second line initially at a rate less than employed for said mixture under said normal operating conditions which is then gradually increased until the rate attained is that used under said normal operating conditions.

8. The process of Claim 7, wherein the initial period is in the range of 0.3 to 1.0 second.

References Cited

"A Guide to the Preparations for Pouring of Froth Foams," Technical Information Bulletin, Selectrofoam Products; Pittsburgh Plate Glass Co., Nov. 23, 1966, pp. 1–6.

"New Portable Helix Mixer for Polyurethene Foam," Du Pont Urethane Foam Bulletin A–31781, June 17, 1963, pp. 1–4.

MAURICE J. WELSH, Jr., Primary Examiner

C. W. IVY, Assistant Examiner

U.S. Cl. X.R.

260—2.5 AF, 2.5 BC